US012653082B2

(12) United States Patent
Hingne et al.

(10) Patent No.: US 12,653,082 B2
(45) Date of Patent: Jun. 16, 2026

(54) HITCH FOR A VEHICLE

(71) Applicant: DEERE & COMPANY, Moline, IL (US)

(72) Inventors: Abhijit Hingne, Khamgaon (IN);
Sanjeev M. Hallale, Pune (IN);
Satyanarayana Ps, Vijayawada (IN);
Achim R. Schibel, Heidelberg (DE);
Martin Heitlinger, Oestringen (DE)

(73) Assignee: Deere & Company, Moline, IL (US)

( * ) Notice: Subject to any disclaimer, the term of this patent is extended or adjusted under 35 U.S.C. 154(b) by 384 days.

(21) Appl. No.: 18/477,781

(22) Filed: Sep. 29, 2023

(65) Prior Publication Data

US 2024/0107929 A1     Apr. 4, 2024

(30) Foreign Application Priority Data

Sep. 30, 2022     (EP) ..................................... 22199030

(51) Int. Cl.
A01B 59/06          (2006.01)
A01B 59/043         (2006.01)

(52) U.S. Cl.
CPC .......... A01B 59/066 (2013.01); A01B 59/043 (2013.01)

(58) Field of Classification Search
CPC ... A01B 59/066; A01B 59/043; A01B 59/064; A01B 59/068; A01B 71/06; A01B 59/002; A01B 59/004
See application file for complete search history.

(56) References Cited

U.S. PATENT DOCUMENTS

| | | | | |
|---|---|---|---|---|
| 2,828,974 | A | 4/1958 | Jameson | |
| 5,593,264 | A * | 1/1997 | Schlegel | ................. F16B 21/16 |
| | | | | 411/351 |
| 6,062,321 | A | 5/2000 | Defrancq | |
| 6,612,380 | B2 * | 9/2003 | Pyle | ..................... A01B 59/043 |
| | | | | 172/677 |
| 6,672,568 | B1 * | 1/2004 | Rawlinson | ............... B66D 1/14 |
| | | | | 254/323 |
| 9,468,138 | B2 * | 10/2016 | Huber | .................. A01B 59/066 |
| 11,617,293 | B2 * | 4/2023 | Thoreson | ............. A01B 59/066 |
| | | | | 172/445 |
| 2015/0122518 | A1 * | 5/2015 | Huber | .................. A01B 59/008 |
| | | | | 172/677 |
| 2020/0128718 | A1 * | 4/2020 | Patino | .................. A01B 63/118 |

FOREIGN PATENT DOCUMENTS

| | | | | |
|---|---|---|---|---|
| DE | 10315174 B3 * | 4/2004 | .......... A01B 59/002 |
| EP | 4029359 A1 | 7/2022 | |
| FR | 2964822 A1 | 3/2012 | |
| JP | H04115974 U | 10/1992 | |

OTHER PUBLICATIONS

European Search Report in application No. 22199030.2, dated Mar. 9, 2023, 8 pages.

* cited by examiner

*Primary Examiner* — Christopher J Sebesta
*Assistant Examiner* — Blake E Scoville

(57)          ABSTRACT
A hitch for a vehicle including a main frame which is mountable to a vehicle chassis, a pair of left and right lower support arms pivotably mounted to the main frame at a first end, each of the pair of left and right lower support arms include a holder at a second end for holding an implement attachment link, and a releasable locking device for fixing the implement attachment link to the holder.

18 Claims, 3 Drawing Sheets

HITCH FOR A VEHICLE

CROSS-REFERENCE TO RELATED APPLICATIONS

This application claims priority to European Patent Application No. 22199030.2, filed Sep. 30, 2022, which is hereby incorporated by reference.

FIELD OF THE DISCLOSURE

The disclosure relates to a hitch for a vehicle.

BACKGROUND

For attaching an implement to an agricultural tractor, a three-point hitch is provided on the tractor. The three-point hitch may be connected to the front or the rear portion of the tractor. The three-point hitch has left and right lower links and a top link. An implement is connected to the tractor using these three linkages of the three-point hitch.

SUMMARY

For different types of operations, different lengths of the lower links are required. For example, for agricultural operations comparatively longer lower links are required, while for municipal operations such as snowplow, road cleaning, etc. shorter lower links are required. Hence, based on the operations, the length of the lower links needs to be selected. When one type of operation is completed and the operator wants to perform another type of operation, first, the set of lower links connected to the hitch needs to be removed. Then, the new set of lower links needs to be connected as per the requirement of the second type of operation. The procedure for changing the lower links is time consuming and cannot easily be done by a single person. Also, special tools are required for changing the lower links.

If same length lower links are used for all the operations, it creates a challenge. For example, when longer length lower links which are used in agricultural applications, are used for municipal operations, it induces lateral stresses in the lower links, especially when they hit a tree or a pole. This may damage the lower links. Also, using longer lower links for a municipal operation makes it difficult for the operator to steer the vehicle. In addition to that, extra ballast needs to be mounted on the rear side of the vehicle.

Hence, an object of the disclosure is to enhance versatility and operability of a hitch for a vehicle, especially an agricultural tractor, of the type mentioned above.

This object is achieved by a hitch for a vehicle with the features of one or more embodiments described herein.

A hitch for a vehicle, in particular for an agricultural tractor, comprises a main frame which is mountable to a vehicle chassis. A pair of left and right lower support arms is pivotably mounted to the main frame at a first or rear end. Each of the support arms at a second or front end comprises a holder for holding an implement attachment link. A releasable locking device is provided for fixing the implement attachment link to the holder.

The releasable locking device of the present disclosure enables the implement attachment links to be easily and quickly removed from the support arms. A new set of implement attachment links can then be easily connected to the support arms. The implement attachment links are selected as per the requirement of the operation and connected to the support arms. As per requirement of the operation, the implement attachment links can be different in lengths or shapes. In transport mode, the implement attachment link is either removed completely or it may be replaced by a shorter implement attachment link. This helps the operator to steer the vehicle with ease. The present disclosure enables tremendous reduction in time and effort while removing one set of implement attachment links and connecting a new set of implement attachment links. Changing the implement attachment links is comfortably done by hand, without any tool.

The hitch disclosed in respect of the present disclosure is a front hitch, however it can be a rear hitch also. The main frame of the hitch is mountable to the tractor. The support arms are pivotably mounted to the main frame with a nut and bolt arrangement. However, it may be mounted by any other fastening method. A hydraulic cylinder is attached to the support arms which can lift and/or lower the support arms whenever required. An electric machine may be used to lift and/or lower the support arms instead of the hydraulic cylinders. The support arms and the implement attachment links are made of a material having high load bearing capacity. The length of the support arms is kept shorter, so that it will not get the additional bending stresses which may be induced because of more length.

Additional embodiments of the hitch are disclosed in one or more embodiments described herein.

According to one of the example embodiments, the implement attachment link is inserted within the holder. The holder comprises a slot formed by a first bracket and a second bracket. The implement attachment link is inserted within the slot in order to establish a form fit connection. The form fit connection ensures that there should not be any relative movement between implement attachment link and the support arm. The rectangular profile of the slot further helps to restrain any undesirable movement. The first bracket and the second bracket are made as a single unit. However, it is possible that it may be made of two different elements connected by a fastening member or welded together. The slot of the support member and the implement attachment link are coated with a wear resistant material. The holes are provided on the first bracket, the second bracket and the implement attachment link. The second bracket of the slot has a flange around the hole on an external side. The flange further has two diametrical apertures. A cap is provided over the hole in the first bracket. The slot and the implement attachment link are rectangular in shape; however, it will be appreciated that it can be a circular shape, a square shape, a polygonal shape, etc.

Furthermore, the locking device comprises a locking pin which is inserted through aligning holes on the first bracket, the second bracket and the implement attachment link. The length of the locking pin is more than the width of the slot. The locking pin has a head at one side and an aperture at the other side. The head has a flat surface which aligns with the cap provided over the hole on the first bracket. This stops the implement attachment link from rotating within the support arm, ensuring a rigid connection between the implement attachment link and the support arm. Furthermore, the flat surface on the head of the locking pin and the cap provided over the hole on the first bracket aligns the apertures on the locking pin and the diametrical apertures on the flange of the second bracket. A safety pin is inserted through the aligning apertures on the locking pin and diametrical apertures on the flanges of the second bracket. The safety pin does not allow the locking pin to get out of the assembly. The locking pin is inserted through the assembly of the first bracket, the second bracket and the implement attachment link and then retained in that position by the safety pin. The locking pin is also made of a high stress bearable material with resistance coating. The aligning holes and the locking pin are circular in shape; however, it will be appreciated that it may be of any other shape such as a square, a polygonal, a rectangular, etc.

The locking pin can be inserted manually through the aligning holes. The locking pin has a gripping portion which helps the operator to comfortably push and pull the locking pin in and out of the aligning holes. The locking pin head is provided with a chain which is connected to the support arm. While changing the implement attachment link, the operator sometimes loses the locking pin. The chain attached to the locking pin keeps the locking pin always close to the assembly. This further helps reduce the time for changing the implement attachment link. It is possible that a spring-loaded mechanism can be used to push the locking pin through the aligning holes. The locking device can be any other mechanism such as spring-loaded hook arrangement.

The above and other features will become apparent from the following detailed description and accompanying drawings.

BRIEF DESCRIPTION OF THE DRAWINGS

A hitch according to the disclosure is explained in greater detail below on the basis of the enclosed drawings, wherein matching reference numbers designate components which are structurally identical or comparable in terms of their function. In the drawings.

DETAILED DESCRIPTION

The embodiments or implementations disclosed in the above drawings and the following detailed description are not intended to be exhaustive or to limit the present disclosure to these embodiments or implementations.

Figures 1, 2:
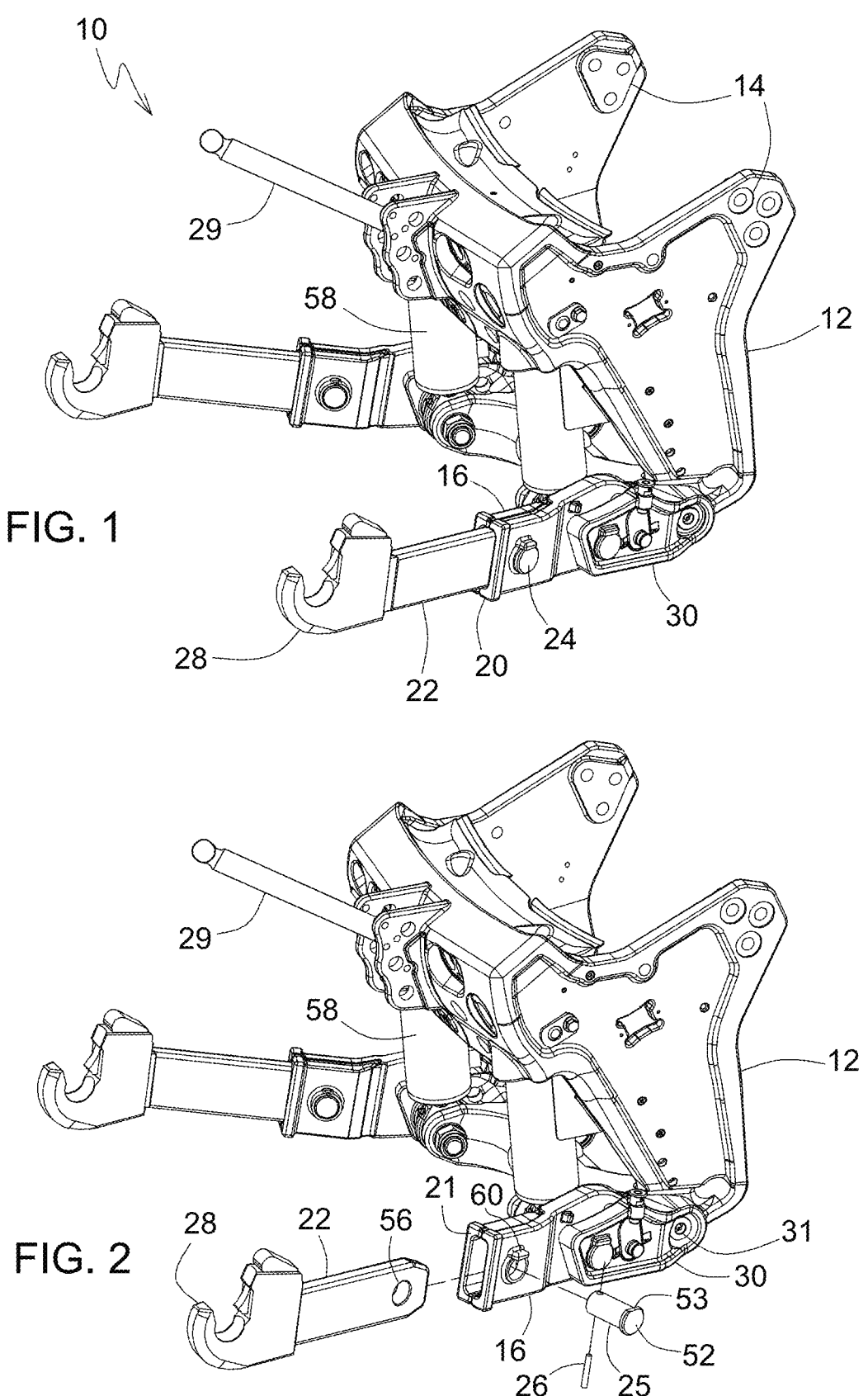
FIG. 1 shows a perspective view of an example embodiment of the hitch according to the disclosure for an agricultural tractor for a first type of implement.
FIG. 2 shows the hitch according to FIG. 1 in a disassembled state.

FIG. 1 shows a perspective view of a hitch 10 for an agricultural tractor (not shown). The hitch 10 comprises a main frame 12 which is mounted to the tractor by a fastening member 14. The fastening member 14 is a nut and bolt arrangement. A pair of extensions 30 is attached on both sides to the bottom of the main frame 12 in a pivotable manner. A pair of support arms 16 is connected to the pivotable extension 30. Further, an implement attachment link 22 is fixed to each of the support arms 16, for example, the implement attachment link 22 is inserted within the support arm 16. The implement attachment link 22 has a coupling member 28 at a free end. The hitch 10 also comprises an upper link 29. The implement is attached to the hitch 10 using the upper link 29 and the coupling members 28 on both the implement attachment links 22.

Figures 6, 7:
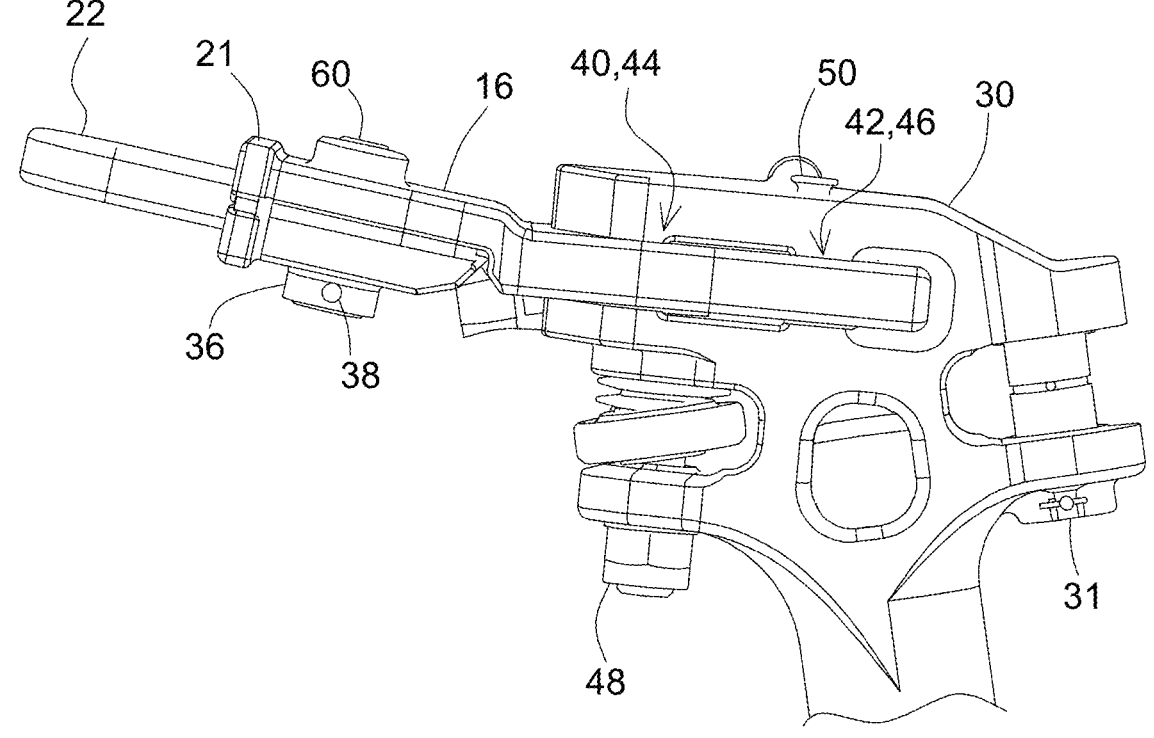
FIG. 6 shows a bottom view of the hitch according to present disclosure.
FIG. 7 shows a side view of a pivotable extension of a main frame.

As shown in FIG. 7, at a rear end, the extension 30 is pivotably connected to the main frame 12 by a pivotable connection 31. The extension 30 has two holes 44 and 46 at a front end. The support arm 16 has a hole 40 and a hole 42. A fastening element 48 is inserted through the holes 44 on the extension 30 and the hole 40 on the support arm 16. Another fastening element 50 is inserted through the holes 46 on the extension 30 and the hole 42 on the support arm 16. The fastening provided at two places with fastening element 48 and 50 makes a rigid connection between support arm 16 and the extension 30. The fastening element is a nut and bolt arrangement.

A hydraulic cylinder 58 is attached to the main frame 12 at an upper side, and at a lower side, it is connected to the support arm 16 by the fastening element 48. The extension 30, the support arm 16 and the hydraulic cylinder 58 are held together by the fastening element 48. The hydraulic cylinder 58 is used to lift and/or lower the support arm 16 through the pivotable connection 31.

Figure 5:
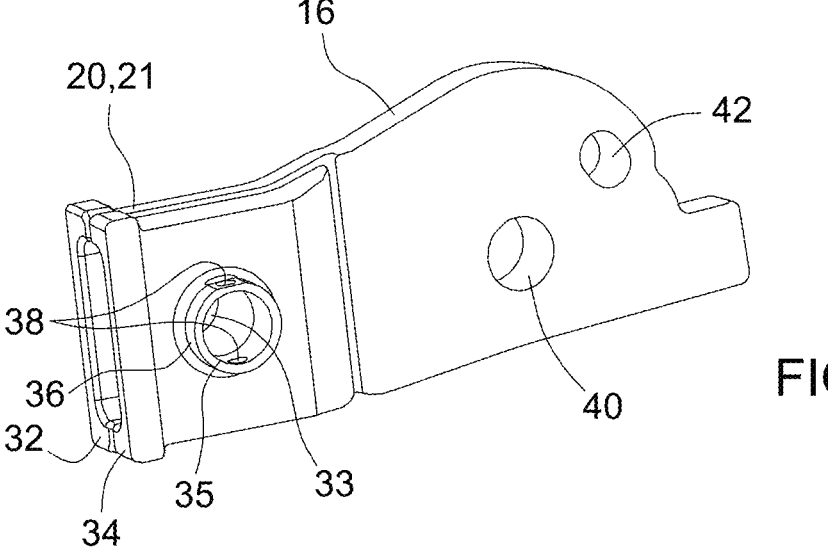
FIG. 5 shows a perspective view of a support arm having a flange with diametrically placed apertures.

As shown in FIG. 5, the support arm 16 has a holder 20 at a front end. The holder 20 comprises a slot 21 formed by the first and second brackets 32 and 34. The brackets 32 and 34 are formed as a single part. Although, it is possible, these can be separate parts connected by welding, nut and bolt, or any other connecting method. The bracket 32 has a hole 33 and bracket 34 has a hole 35. A cap 60 is provided over the hole 33 of the first bracket 32. A flange 36 is provided on an external side of the hole 35 on the second bracket 34 of the slot 21. The flange 36 has two diametrically placed apertures 38 to receive the safety pin 26.

As shown in FIG. 2, the implement attachment link 22 has the coupling member 28 at a front end and a hole 56 at a rear end. The implement attachment link 22 is inserted within the slot 21 of the support arm 16 to establish a form fit connection. A locking device 24 which comprises a locking pin 25 is inserted through the aligning holes 33, 35 and 56 on the first bracket 32, the second bracket 34 and the implement attachment link 22, respectively. The locking pin 25 has a head 52 at one end and an aperture 54 at the other end. The head 52, further, has a flat surface 53. The flat surface 53 and the cap 60 provided over the hole 33 of the first bracket 32 stops the implement attachment link 22 to rotate within the support arm 16, ensuring a rigid connection. Further, the flat surface 53 and the cap 60 align the aperture 54 of the locking pin 25 and the diametrical apertures 38 on the flange 36 of the second bracket 34. The safety pin 26 is inserted through the aligned apertures 38 and 54. The safety pin 26 does not allow the locking pin 25 to come out while in operation.

The locking pin 25 and the aligning holes 33, 35 and 56 at the first bracket 32, the second bracket 34 and the implement attachment link 22 respectively are circular in shape. However, the person skilled in the art will appreciate other shapes such as rectangular shape, a square shape, a polygonal shape, etc.

The aperture 54 and the diametrical apertures 38 on the flange 36 are circular in shape. However, the person skilled in the art will appreciate other shapes such as rectangular shape, a square shape, a polygonal shape, etc.

The implement attachment link 22 and the slot 21 are rectangular in shape. However, the person skilled in the art will appreciate other shapes such as circular shape, a square shape, a polygonal shape, etc. The rectangular profile restricts the undesirable movement between the implement attachment link 22 and the support arm 16.

A chain (not shown) is with a first end attached to the head 52 of the locking pin 25. With a second end, the chain is connected to the support arm 16. While changing the implement attachment link 22, the locking pin 25 is removed. The chain attached to the head 52 of the locking pin 25 keeps the locking pin 25 close to support arm 16 so that it will not get lost.

As per another embodiment (not shown) of the disclosure the locking pin 25 is inserted through the aligning holes 33, 35 and 56 by a spring-loaded mechanism.

Figure 3:
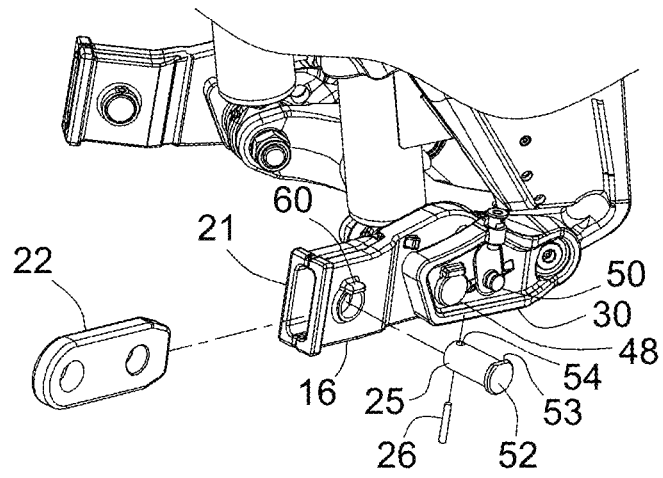
FIG. 3 shows the hitch according to the present disclosure for a second type of implement in a disassembled state.
Figure 4:
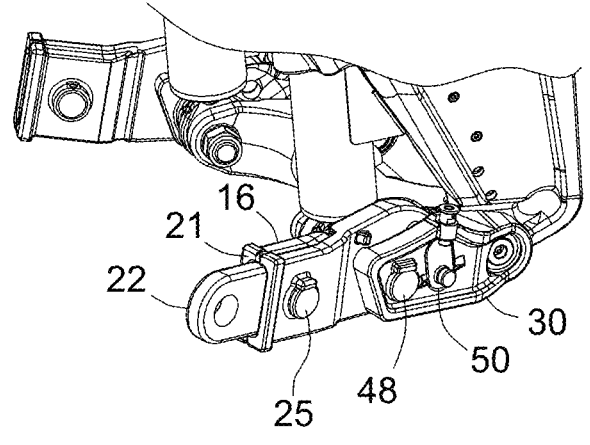
FIG. 4 shows assembly of the hitch components shown in FIG. 3 for the second type of implement.

FIGS. 1 to 4 explain the sequence of changing the implement attachment link 22. FIG. 1 shows a longer implement attachment link 22 connected to the support arm 16. For removing the implement attachment link 22 shown in FIG. 1, first the safety pin 26 needs to be removed. Once the safety pin 26 is removed, the locking pin 25 is free to be removed from aligning holes 33, 35 and 56. Once the locking pin 25 is taken out of the assembly, the implement attachment link 22 can be removed as shown in FIG. 2. As per requirements of the operation, the second type of implement attachment link 22 is inserted within the slot 21 as shown in FIG. 3. In this case, the second implement attachment link 22 is shorter compared to the other one shown in FIG. 1. The locking pin 25 is inserted through the aligning holes at the second type of implement attachment link 22, and the holes 33 and 35 at the first and second bracket 32 and 34. Finally, as shown in FIG. 4 the safety pin 26 inserted through the aligning apertures 38 and 54 holds the locking pin 25 in its position.

For changing the implement attachment link 22, no tool is required. It can be done by hand. The present disclosure helps to reduce the time and effort of changing the implement attachment link 22.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A hitch for a vehicle, comprising:
a main frame which is mountable to a vehicle chassis;
a pair of left and right lower support arms pivotably mounted to the main frame at a first end, each of the pair of left and right lower support arms include a holder at a second end for holding an implement attachment link, the holder including a slot formed by a first bracket and a second bracket, and the implement attachment link positioned between the first bracket and the second bracket in order to establish a form fit connection; and
a releasable locking device for fixing the implement attachment link to the holder; the locking device including a locking pin positioned in a first aligning aperture in the first bracket, a second aligning aperture in the second bracket, and a third aligning aperture in the implement attachment link, the locking pin having a head at a first side and an aperture at the second side to receive a safety pin, the second bracket having a flange around the second aligning aperture at an external side, and the flange including two diametrical apertures to receive the safety pin.

2. The hitch of claim 1, wherein the implement attachment link is inserted within the holder.

3. The hitch of claim 1, wherein the locking pin is forced by a spring-loaded mechanism into the first aligning aperture in the first bracket, the second aligning aperture in the second bracket, and the third aligning aperture in the implement attachment link.

4. The hitch of claim 1, further comprising:
a cap positioned above the first aligning aperture of the first bracket of support arm, the cap aligning with a flat surface of the head of the locking pin in its mounted condition.

5. The hitch of claim 1, wherein the safety pin is positioned through the aperture in the locking pin and the two diametrical apertures in the flange.

6. The hitch of claim 1, wherein the first aligning aperture in the first bracket, the second aligning aperture in the second bracket, the third aligning aperture in the implement attachment link, the locking pin, the aperture in the locking pin, and the two diametrical apertures in the flange have a shape selected from one of a rectangular shape, a circular shape, a square shape, and a polygonal shape.

7. The hitch of claim 1, wherein the holder and the implement attachment link have a shape selected from one of a rectangular shape, a circular shape, a square shape, and a polygonal shape.

8. The hitch of claim 1, wherein the hitch is mountable to a front of the vehicle chassis.

9. The hitch of claim 1, wherein the support arms are liftable hydraulically.

10. An agricultural vehicle including a hitch, comprising:
a main frame which is mountable to a vehicle chassis;
a pair of left and right lower support arms pivotably
mounted to the main frame at a first end, each of the
pair of left and right lower support arms include a
holder at a second end for receiving an implement
attachment link, the holder including a slot formed by
a first bracket and a second bracket, and the implement
attachment link positioned between the first bracket and
the second bracket in order to establish a form fit
connection; and
a releasable locking device for fixing the implement
attachment link to the holder, the locking device includ-
ing a locking pin positioned in a first aligning aperture
in the first bracket, a second aligning aperture in the
second bracket, and a third aligning aperture in the
implement attachment link, the locking pin having a
head at a first side and an aperture at the second side to
receive a safety pin, the second bracket having a flange
around the second aligning aperture at an external side,
and the flange including two diametrical apertures to
receive the safety pin.

11. The agricultural vehicle of claim 10, wherein the
locking pin is forced by a spring-loaded mechanism into the
first aligning aperture in the first bracket, the second aligning
aperture in the second bracket, and the third aligning aper-
ture in the implement attachment link.

12. The agricultural vehicle of claim 10, further compris-
ing:
a cap positioned above the first aligning aperture of the
first bracket of support arm, the cap aligning with a flat
surface of the head of the locking pin in its mounted
condition.

13. A hitch for a vehicle, comprising:
a main frame which is mountable to a vehicle chassis;
a pair of left and right lower support arms pivotably
mounted to the main frame at a first end, each of the pair of left and right lower support arms include a
holder at a second end for holding an implement
attachment link, the holder including a slot formed by
a first bracket and a second bracket, and the implement
attachment link positioned between the first bracket and
the second bracket in order to establish a form fit
connection;
a releasable locking device for fixing the implement
attachment link to the holder, the locking device includ-
ing a locking pin positioned in a first aligning aperture
in the first bracket, a second aligning aperture in the
second bracket, and a third aligning aperture in the
implement attachment link, the locking pin having a
head at a first side and an aperture at the second side to
receive a safety pin; and
a cap positioned above the first aligning aperture of the
first bracket of support arm, the cap aligning with a flat
surface of the head of the locking pin in its mounted
condition.

14. The hitch of claim 13, wherein the locking pin is
forced by a spring-loaded mechanism into the first aligning
aperture in the first bracket, the second aligning aperture in
the second bracket, and the third aligning aperture in the
implement attachment link.

15. The hitch of claim 13, wherein the holder and the
implement attachment link have a shape selected from one
of a rectangular shape, a circular shape, a square shape, and
a polygonal shape.

16. The hitch of claim 13, wherein the implement attach-
ment link is inserted within the holder.

17. The hitch of claim 13, wherein the hitch is mountable
to a front of the vehicle chassis.

18. The hitch of claim 13, wherein the support arms are
liftable hydraulically.

* * * * *